United States Patent [19]
Gore

[11] 3,764,048
[45] Oct. 9, 1973

[54] UNDERCARRIAGE CONTAINER

[76] Inventor: Isaac E. Gore, P. O. Box 1234, Walteria, Calif.

[22] Filed: Mar. 24, 1971

[21] Appl. No.: 127,721

[52] U.S. Cl............... 224/42.41, 224/29 R, 296/37
[51] Int. Cl............................................. B60r 9/02
[58] Field of Search.................. 214/453, 454, 450; 296/37; 224/42.41, 29 R, 42.23

[56] References Cited
UNITED STATES PATENTS

| 1,453,362 | 5/1923 | Loveland | 224/42.41 X |
| 3,464,606 | 9/1969 | Nordeen | 224/29 R |
| 2,936,918 | 5/1960 | Vais | 214/454 |
| 3,386,765 | 6/1968 | Drach | 296/37 R |
| 1,153,305 | 9/1915 | Heath | 214/454 |

Primary Examiner—Robert J. Spar
Assistant Examiner—Sidney Harris
Attorney—Nilsson, Robbins, Wills & Berliner

[57] ABSTRACT

A container for the underside of a motor vehicle is formed with a panel which is secured to an elongate undercarriage chassis member and extends from the chassis member to the side of the vehicle.

7 Claims, 4 Drawing Figures

Patented Oct. 9, 1973
3,764,048
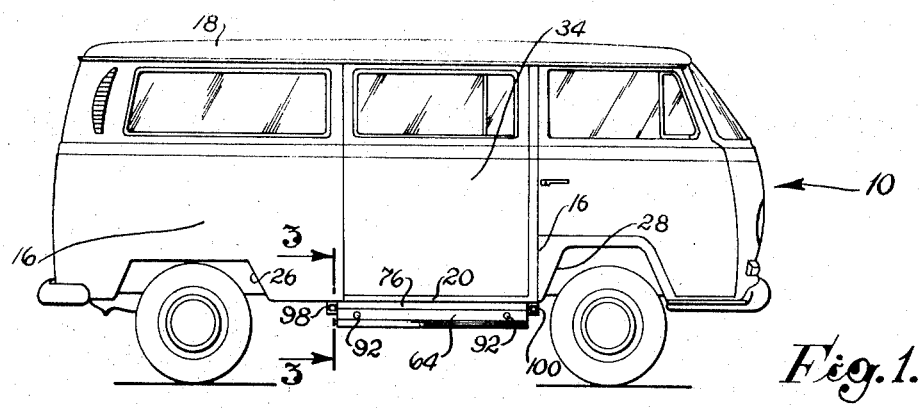
Fig.1.
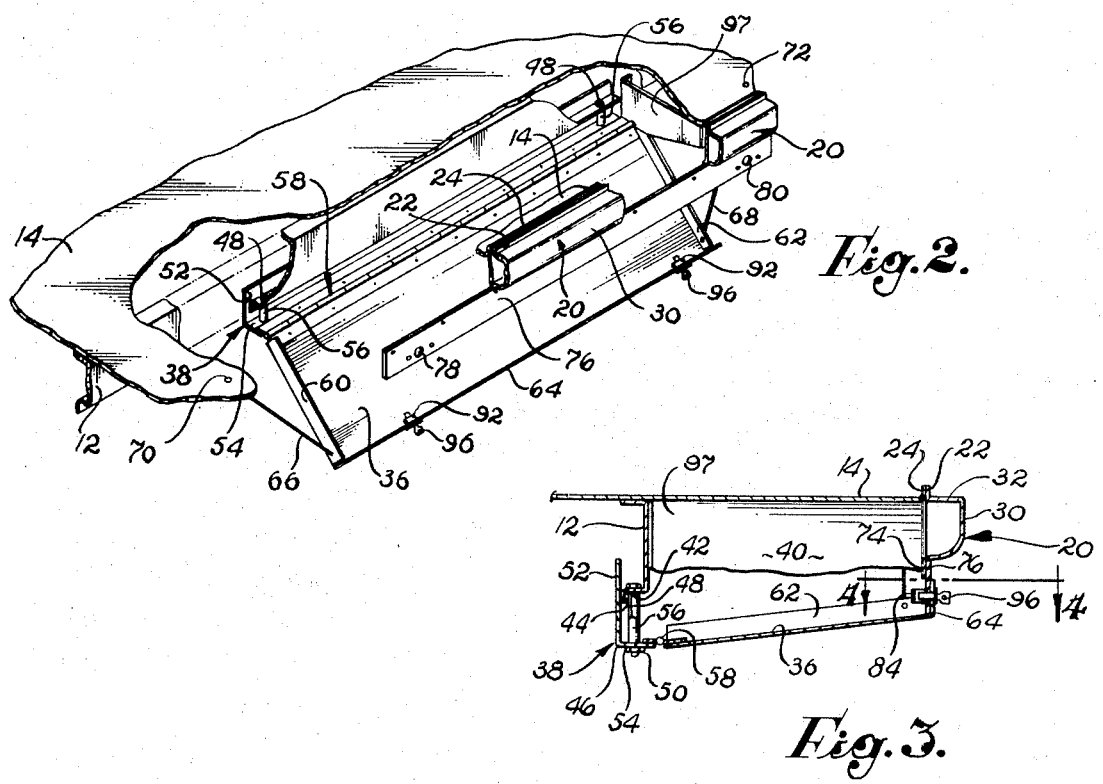
Fig.2.
Fig.3.
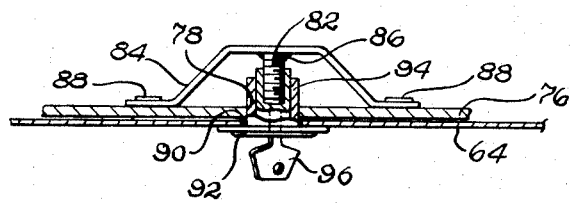
Fig.4.
INVENTOR.
ISAAC E. GORE.
BY
NILSSON, ROBBINS, WILLS & BERLINER
ATTORNEYS

UNDERCARRIAGE CONTAINER

FIELD OF THE INVENTION

The fields of art to which the invention pertains include the fields of auxiliary article compartments for land vehicles and underslung vehicle attached package and article carriers.

BACKGROUND AND SUMMARY OF THE INVENTION

With the growing popularity of camping, it has become common to outfit motor vehicles of the autobus or delivery van type so as to be suitable as campers. The van is fitted internally with sleeping quarters, dining areas, and sometimes cooking facilities, all with a view toward carrying as much comfort and convenience facilities as possible. Typically, every inch of available space is utilized to its capacity. The autobus or rear-engine van having a generally flat bottom is particularly useful in providing a large amount of storage space relative to the size of the vehicle.

The present invention creates additional storage space for a motor vehicle and is particularly useful with a flat bottom autobus or delivery van as above described. In particular, the present invention utilizes an undercarriage chassis member running lengthwise of the vehicle. A panel is pivotally connected between the chassis member and the side of the vehicle and defines a container with the bottom of the vehicle. Specifically, a rear support member is secured dependent from a chassis member which is spaced inwardly from the side of the vehicle. A bottom panel is pivotally connected to the rear support member, spaced downwardly from the vehicle underside a distance defining the depth of the container, and extending toward the side member where it is releasably secured. An elongate face panel extends upwardly from the bottom panel and carries a sleeve lock on each end which engages a stud carried by an elongate coincident bar secured dependent from the side of the vehicle. A pair of end panels secured to the chassis member enclose the container when the panel is pivoted to its uppermost position.

While a variety of undercarriage containers have been proposed for motor vehicles, none have provided a container having as much facility and ready access as the present container. See for example U.S. Pat. Nos. 1,049,951, 2,607,518, 3,019,047 and 3,259,423. One of the advantages of the present structure is that it can be constructed as wide as the loading door of the vehicle. Accordingly, awnings for the doorway can be readily stored within the container which provides ready access to the awnings when it is desired to attach them to the vehicle. As a result of the unique construction provided herein, the container does not extend a significant distance below the chasis member, but in view of the depth of the chassis member, the bottom panel of the container is spaced a substantial distance from the underside of the vehicle, creating a useful amount of new storage space.

BRIEF DESCRIPTION OF THE DRAWINGS

FIG. 1 is a side view of a rear-engine delivery van incorporating a container in accordance with this invention;

FIG. 2 is a perspective view, partly broken away, of the container of this invention, secured in place, showing the container open;

FIG. 3 is a cross-sectional view of the container and connecting components of the vehicle, taken on line 3—3 of FIG. 1, in the direction of the arrows; and FIG. 4 is a cross-sectional view of a locking mechanism utilized herein, taken on line 4—4 of FIG 3, in the direction of the arrows.

DETAILED DESCRIPTION

As required, a detailed illustrative embodiment of the invention is disclosed herein. However, it is to be understood that this embodiment merely exemplifies the invention which may take many forms substantially different from the specific illustrative embodiment disclosed. Therefore, specific structural and functional details are not to be interpreted as limiting, but merely as a basis for the claims.

Referring to FIGS. 1 and 2, there is illustrated one form of compact delivery van 10 of the type which is readily converted for use as a camper or the like. The van 10 includes a chassis, one member 12 being shown in FIG. 2, supporting a generally flat floor 14 and the vehicle body. The body includes side panels 16 which define the width of the van 10 and which extend from the roof 18 to the floor 14. A sill 20 is formed of a metal channel having an upright lip 22 which is secured to a corresponding lip 24 upright from the floor 14. The sill 20 extends from the rear wheel well 26 to the forward wheel well 28. The outer surface 30 of the sill is flush with the lower edge of the side panels 16 and the top surface 32 constitutes a floor for the door 34.

Referring additionally to FIG. 3, additional storage space for the van 10 is created by taking advantage of the space allowance between the flat floor 14 of the vehicle and the undercarriage chassis components. In particular, the van includes an elongate chassis member running lengthwise of the van 10 and which is spaced inwardly a substantial distance from the sill 20. A bottom panel 36 is connected via a pivot assembly to the chassis member 12 and extends to the side of the vehicle to define a compartment 40.

The chassis member 12 is a metal channel having a lower leg 42 formed with a dependent lip 44. The pivot assembly 38 includes a rear support member 46 in the shape of an elongate angle iron having an upright leg 52 and horizontal leg 54. The rear support member 46 is secured by means of bolts 48 and nuts 50 through the member 46 and chassis member leg 42 at their opposite ends, so that the support member upright leg 52 abuts the chassis member lip 44. The horizontal leg 54 is spaced downwardly from the chassis member leg 42 by means of spacers 56 through which the bolts 48 are disposed.

One leaf of a piano hinge 58, arranged to pivot downwardly, is secured by screws, or by spot welding, to the horizontal support member leg 54 to constitute the pivot assembly 38. The other leaf of the hinge 58 is similarly secured to the inner edge of the bottom container panel 36. The sides of the panel 36 are turned up to form edge panels 60 and 62 and the front of the panel 36 is turned up to form a face panel 64. Support cords 66 and 68 connect the outer ends of the edge panels 60 and 62 to the vehicle floor 14, at 70 and 72, to thereby limit the extent of downward pivot of the bottom panel 36.

The sill 20 is formed with a dependent lip 74 and an elongate fixing bar 76 is secured lengthwise of the lip 72 by screws or spot welds or the like so as to depend from the sill 20. When the bottom panel 36 is pivoted to a closed position, the face panel 64 rides over the fixing bar 76. The fixing bar 76 is formed at opposite ends with a pair of apertures 78 and 80. Referring additionally to FIG. 4, a threaded stud 82 is carried by a bridging bracket 84 rearwardly of each aperture 78 and 80. The stud is welded at 86 to the inner surface of the brakcet 84 and the bracket is secured by grommets 88, or the like, rearwardly of the fixing bar 76. The face panel is formed with a pair of openings, such as at 90, coincident, when closed, with the openings 78 and 80 through the fixing bar. A double barrel sleeve lock 92, having a threaded inner sleeve 94, is secured within each opening so that when the bottom panel is moved upwardly to its closed poistion, the sleeve 94 engages the threaded stud 82 carried rearwardly of the fixing bar 76. By turning the key 96, the inner sleeve 94 is rotated until the face panel 64 is flush with the fixing bar 76, closing the container.

Referring specifically to FIGS. 2 and 3, a pair of end closing panels 97 are secured by bolting or by welding to the undercarriage chassis membr 12 so as to jut outwardly in extension to the rear surface of the sill 20, thereby providing lateral enclosure for the container when the bottom panel 36 is in its upright position.

Referring specifically to FIG. 1, the container juts only a small distance below the normal bottom edge line of the vehicle, and, In this instance, sits between a pair of jack inserts 98 and 100 on opposite sides of the door 34. It will be seen that the container, defined by the components as above described, is as wide as the door and can advantageously be utilized to store an awning, or the like, for the door. In use, one need merely open the locks 92 and the bottom panel 36 pivots downwardly to expose the contents of the container. The rear support member, as a result of its spacing downwardly from the chassis member 12, provides a fixed shelf for poles and the like. In order to close the container one need merely lift the bottom panel 36 and secure the locks 92.

In an exemplary installation, the bottom panel 36 is about 47 inches long, and about 14 inches wide, the bottom leg 54 of the rear support member is about 3 inches wide, and the container is about 8 inches deep at its back and about 7 inches deep at its front. Accordingly, about 3½ cubic feet of additional space is provided.

I claim:

1. In a van-type motor vehicle having a side door and a floor and having a lower side member as its outermost member and an elongate undercarriage chassis member spaced inwardly from said side member, each running lengthwise of said vehicle, the improvement forming a container for said vehicle, comprising:

a rear support elongate member extending the length of said container;

means for connecting said rear suport member to said chassis member;

a bottom panel pivotally connected to said rear support member, spaced downwardly from said vehicle floor and extending toward said side member, said bottom panel having upstanding panel members at each end thereof and located parallel to and on the outside of end panels in the closed position thereof;

end panels on opposite sides of said bottom panel, extending from said chassis member to said side member, said end panels being vertical and fixed relative to said chassis member and said side member;

the floor of said vehicle constituting a top panel for said container; and a face panel extending from said bottom panel at said side member and means for releasably securing said face panel to said side member to close said container, said face panel being fixed to, and extending upwardly from, the outer edge of said bottom panel in its closed position;

the outermost portion of said container being below and in vertical alignment with the door of said vehicle; and said chassis member, said end panels and said lower side member constituting four fixed walls of said container.

2. The invention according to claim 1 in which said end panels are secured independently of said bottom panel.

3. The invention according to claim 1 in which said securing means comprises an elongate bar depending from said side member and an elongate face panel extending from said bottom panel into engagement with said bar.

4. The invention according to claim 3 including a sleeve lock carried by said face panel, said bar defining an opening for said lock, and including a stud carried rearwardly of said bar for engagement with said lock.

5. The invention according to claim 1 in which said rear support member depends from said chassis member a distance from said vehicle underside defining, together with the depth of said chassis member, the depth of said container.

6. The invention according to claim 1 in which said rear support member extends toward said side member a distance at least the width of said chassis member to define a shelf for said container.

7. The invention according to claim 1 in which said bottom panel is pivotally connected to said rear support member by a piano hinge extending the length of said container.

* * * * *